M. J. A. BROWN.
Hay Rake and Tedder.
No. 215,565. Patented May 20, 1879.
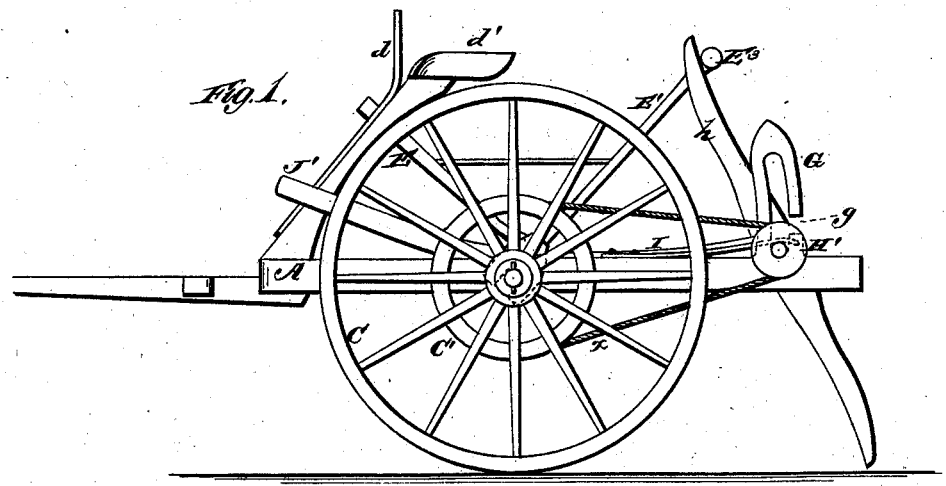
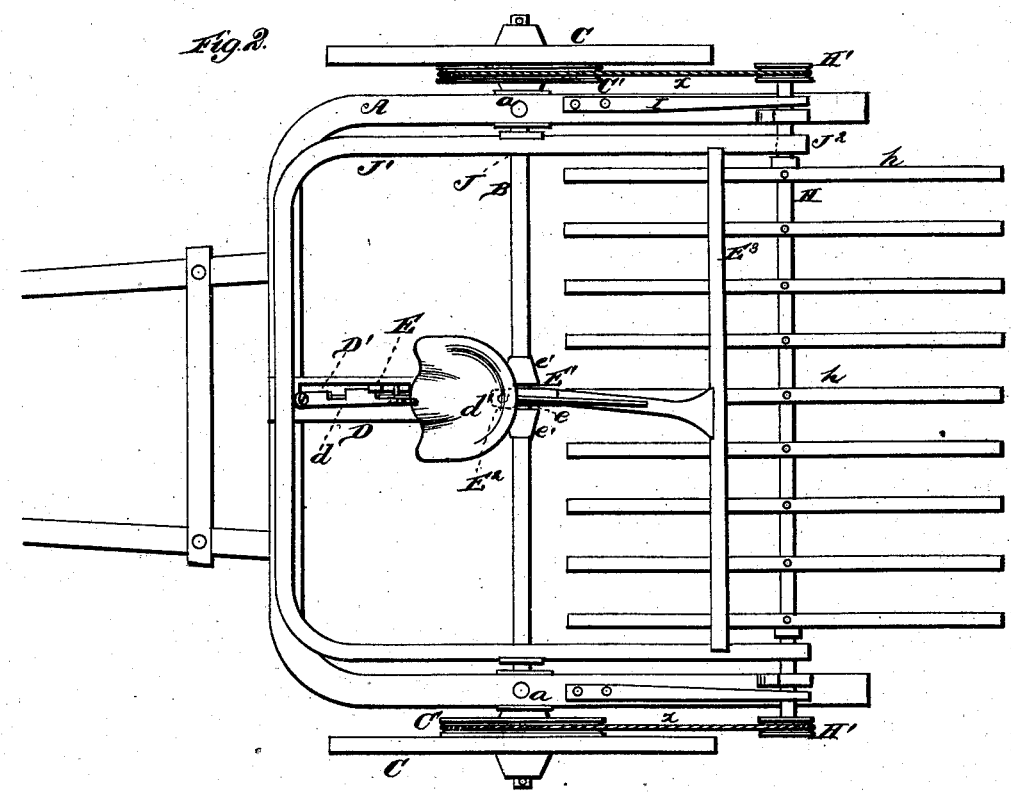
WITNESSES
Robert Everett
H. Clay Smith
INVENTOR
Major J. A. Brown
By Gilmore, Smith & Co.
ATTORNEYS

UNITED STATES PATENT OFFICE.

MAJOR JOHN ANDRE BROWN, OF ANN ARBOR, MICHIGAN.

IMPROVEMENT IN HAY RAKE AND TEDDER.

Specification forming part of Letters Patent No. 215,565, dated May 20, 1879; application filed March 22, 1879.

*To all whom it may concern:*

Be it known that I, MAJOR J. A. BROWN, of Ann Arbor, in the county of Washtenaw and State of Michigan, have invented certain new and useful Improvements in Hay Rake and Tedder; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of a machine embodying my improvements, and Fig. 2 is a plan view of the same.

My invention relates to a combined hay rake and tedder; and the novelty consists in the construction and arrangement of parts, as will be more fully hereinafter set forth.

Referring to the accompanying drawings, forming part of this specification, A represents the frame, in which is suitably journaled, at $a$, the axle B, carrying wheels C, rigid with which are driving-pulleys C'. The wheels C are the riding-wheels, and revolve upon the axle B, as shown. The thills or pole are secured to the frame, and from the forward part rises the seat-standard D, having slot D', and upon this standard is pivoted a rack-lever, $d$, as shown. The seat $d'$ forms the apex of the standard, and within the slot D' operates an arm, E, of the rake-stop. This stop is formed of the said arm E, which is governed by the pivoted rack-bar $d$, the shank $E^1$ rigid therewith, to form an elbow-lever, the pivotal point or fulcrum of which is at $e$ upon the axle, where two collars, $e'$, form a guide for the jaws $E^2$ of the lever, which jaws embrace the axle B. Upon the upper end of the shank $E^1$ is a cross-bar, $E^3$, which operates to stop or trip the rake.

Upon the back end of the frame is formed or secured open guide-sockets G, the lower part of which is the bearing for the rake-shaft H, carrying teeth $h$, and upon each end pulley H', which are belted to the driving-pulleys C' by bands $x$. A slot or opening, $g$, in the sockets G allows the ready removal of the rake and its replacement when desired. The rake is held down to its bearing by a spring, I, upon the frame A.

Pivoted upon the axle at J is a curved double-arm lever, $J^1$, having jaws $J^2$ upon each end, which embrace the shaft H. The transverse portion of this lever J is within easy reach of the driver. The pivoted rack-lever $d$ is also adjacent to the driver's seat, a handle passing up between his legs, if desired.

When used as a rake, the arm E, being held by the trip-lever $d$, holds the stop against the rake-teeth until the trip releases the arm E, which releases the rake. It revolves, the stop falls back into position, and the rake operates as before.

To avoid obstructions the lever J is depressed, which raises the rake against the force of the spring until the obstruction is passed, when the spring forces the rake down into its bearing.

When used as a tedder, throw the stop out of operation or remove it altogether, and reverse the ends of the rake. The operation is thus obvious.

I claim—

1. The guide-sockets G, having slots $g$, combined with a reversible rake and means, J J', for elevating the same, as specified.

2. The curved lever $J^1$, having jaws $J^2$, combined with the rake-shaft H, springs I, and guide-sockets G $g$, as set forth.

In testimony that I claim the above I have hereunto subscribed my name in the presence of two witnesses.

MAJOR JOHN ANDRE BROWN.

Witnesses:
R. WATERMAN,
C. D. HENDRICKSON.